(12) United States Patent
Delplace et al.

(10) Patent No.: US 12,272,915 B2
(45) Date of Patent: Apr. 8, 2025

(54) SUPERCONDUCTING CABLE SYSTEM

(71) Applicant: NEXANS, Courbevoie (FR)

(72) Inventors: Sébastien Delplace, Loon-Plage (FR); Nicolas Lallouet, Baincthun (FR)

(73) Assignee: NEXANS, Courbevoie (FR)

( * ) Notice: Subject to any disclaimer, the term of this patent is extended or adjusted under 35 U.S.C. 154(b) by 219 days.

(21) Appl. No.: 17/856,938

(22) Filed: Jul. 1, 2022

(65) Prior Publication Data

US 2023/0044452 A1  Feb. 9, 2023

(51) Int. Cl.
*H01R 12/00* (2006.01)
*H01B 12/16* (2006.01)
*H01R 4/68* (2006.01)

(52) U.S. Cl.
CPC ............... *H01R 4/68* (2013.01); *H01B 12/16* (2013.01)

(58) Field of Classification Search
CPC .......... H01R 4/68; H01B 12/16; H01B 12/00; Y10S 336/01; Y10S 505/885; Y10S 505/886; Y10S 505/887; H01F 6/06
See application file for complete search history.

(56) References Cited

U.S. PATENT DOCUMENTS

| | | | |
|---|---|---|---|
| 7,296,419 B2 | 11/2007 | Suzawa et al. | |
| 2007/0137881 A1 | 6/2007 | Ashibe | |
| 2014/0027141 A1 | 1/2014 | Yagi et al. | |

FOREIGN PATENT DOCUMENTS

| | | |
|---|---|---|
| FR | 2178438 | 11/1973 |
| KR | 20190010028 | 1/2019 |
| WO | 2011/152344 | 12/2011 |

OTHER PUBLICATIONS

International Search Report dated Mar. 25, 2022.

*Primary Examiner* — Jeremy C Norris
(74) *Attorney, Agent, or Firm* — Sofer & Haroun, LLP

(57) ABSTRACT

A superconducting cable system includes a superconducting cable (1); a first cryogenic jacket (2) containing the cable (1); and a superconducting device (8) connected to the cable (1). The superconducting cable system also has a second cryogenic jacket (7) containing the superconducting device (8); at least one first terminal (3) connected to the superconducting device (8); and a cooling unit (4) connected to the at least one first terminal (3).

14 Claims, 3 Drawing Sheets

SUPERCONDUCTING CABLE SYSTEM

RELATED APPLICATION

This application claims the benefit of priority from French Patent Application No. 21 08138, filed on Jul. 27, 2021, the entirety of which is incorporated by reference.

FIELD OF THE INVENTION

The present invention relates to a superconducting cable system.

The invention belongs to the field of electrical cables.

BACKGROUND

For many years, a number of superconducting cable system projects have been developed and tested successfully all around the world. At the same time, superconducting devices such as superconducting fault current limiters, superconducting switching devices, superconducting transformers and motors, etc., have been developed in the laboratory or on an industrial scale.

However, these two technologies have not been combined so as to produce a complete integrated system.

There is therefore a need to define a superconducting cable system arrangement that is capable of receiving superconducting devices in a totally integrated way.

OBJECTS AND SUMMARY

The aim of the present invention is to overcome the aforementioned shortcomings of the prior art.

To this end, the present invention provides a superconducting cable system, characterized in that it comprises:
- a superconducting cable;
- a first cryogenic jacket containing the cable;
- a superconducting device connected to the cable;
- a second cryogenic jacket containing the superconducting device;
- at least one first terminal connected to the superconducting device;
- a cooling unit connected to the at least one first terminal.

Thus, the present invention allows complete integration of the superconducting cable and of one or more superconducting devices into one and the same system. This makes it possible to reduce the overall cost, in particular owing to the reduction in the number of cryogenic jackets but also civil-engineering installation costs, since the footprint is reduced. Furthermore, this simplifies the use of the cooling system, given the absence of a dual cooling system or the absence of a division of the cooling fluid. Moreover, the superconducting device may be easily disconnected and replaced with another device, for example when renovating the system. The invention may also make it possible to reduce the environmental footprint of the system.

In one particular embodiment, the system further comprises an electric-field-management component connected to a first end of the cable.

This makes it possible to manage the electric field after terminating the screen of the cable.

In one particular embodiment, the electric-field-management component is contained in the second cryogenic jacket.

In one particular embodiment, the electric-field-management component is a capacitor cone.

In one particular embodiment, the system further comprises a cryogenic transfer line connecting the cooling unit to the at least one first terminal.

In one particular embodiment, the first and second cryogenic jackets are mutually connected.

In one particular embodiment, the superconducting device is connected to the cable by way of at least one dedicated electrical connection.

In one particular embodiment, the at least one dedicated electrical connection can be plugged in.

This makes it possible to facilitate the assembly between the cable and the superconducting device.

In one particular embodiment, the system further comprises:
- a second terminal;
- a cryogenic transfer return line connecting the cooling unit to said second terminal.

This allows the cryogenic fluid to circulate and it to be re-cooled.

In one particular embodiment, the cooling unit is a closed circuit.

As a variant, the cooling unit is an open circuit and the system further comprises a cold storage tank linked to the cooling unit.

In one particular embodiment, the at least one first terminal is connected directly to the superconducting device.

This configuration is particularly advantageous when it may be difficult to place the superconducting device in the vicinity of the connection of the superconducting cable, in particular in the case where this involves civil-engineering work that is excessively expensive or if the connection is entirely buried.

As a variant, the at least one first terminal is connected to a second end of the cable and to the first jacket.

In one particular embodiment, the second cryogenic jacket comprises a plurality of inlets that are designed to respectively connect a plurality of additional superconducting cables to the superconducting device, each of the superconducting cables of the plurality of superconducting cables being equipped with an additional electric-field-management component.

This allows the superconducting device to play the role of a distribution box.

BRIEF DESCRIPTION OF THE DRAWINGS

Other aspects and advantages of the invention will become apparent on reading the detailed description below of particular embodiments, which are given by way of wholly non-limiting example, with reference to the appended drawings, in which.

DETAILED DESCRIPTION OF EMBODIMENT(S)

Figure 1:
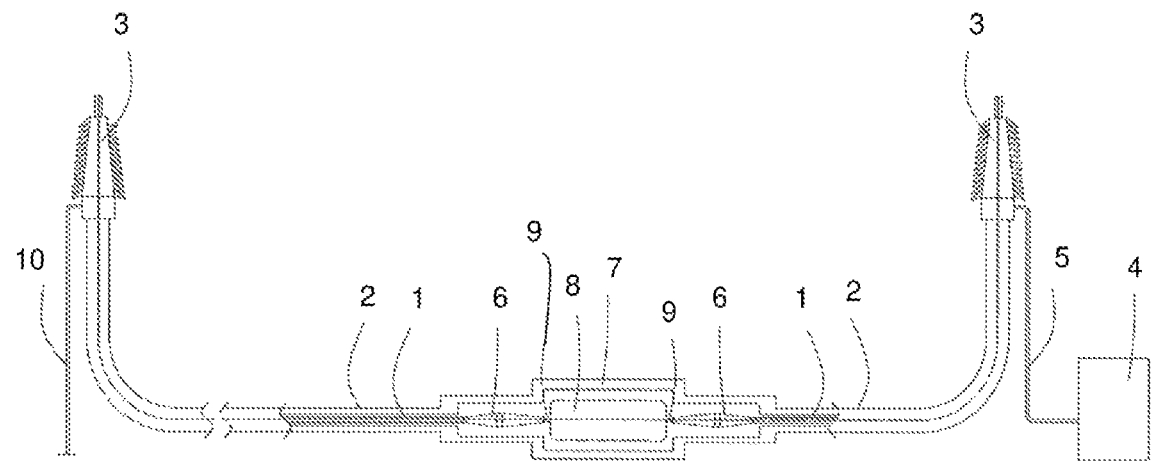
FIG. 1 is a schematic representation of a system in accordance with the present invention, in a first particular embodiment.

As shown in FIG. 1, in one particular embodiment, a superconducting cable system in accordance with the present invention comprises a superconducting cable 1 and a superconducting device 8 connected to the cable 1, for example by at least one dedicated electrical connection 9.

Advantageously, this electrical connection 9 can be plugged in. It may, for example, be standardized and be identical regardless of the superconducting device 8 that is to be connected.

The system further comprises a first cryogenic jacket 2 containing the cable 1 and a second cryogenic jacket 7 containing the superconducting device 8.

The system also comprises at least one first terminal 3 connected to the superconducting device 8 and a cooling unit 4 connected to the at least one first terminal 3.

The cooling unit 4 may be connected to the first terminal 3 by way of a dedicated cryogenic transfer line 5 that is comprised in the system.

The first terminal 3 allows the transmission of current and of voltage at between cryogenic temperature and ambient temperature and may be connected to an electrical grid or to any other current supply.

In the embodiment of FIG. 1, the first terminal 3 is connected to the superconducting device 8 by way of the cable 1 and of the first cryogenic jacket 2, which are connected, at one of their respective ends, to the first terminal 3 and, at their other respective end, to the superconducting device 8.

At the end of the cable 1 that is opposite to the end that is connected to the first terminal 3, the cable 1 is connected to an electric-field-management component 6.

In the particular embodiment of FIG. 1, this electric-field-management component 6, which allows the electric field to be managed after the screen of the cable 1 has terminated, is contained in the second cryogenic jacket 7 which contains the superconducting device 8 and is wrapped up in said jacket.

By way of wholly non-limiting example, the electric-field-management component 6 may be a capacitor cone or a feed-through or any other component considered appropriate.

The first cryogenic jacket 2 of the cable 1 and the second cryogenic jacket 7 of the superconducting device 8 may be mutually connected, advantageously via a standardized interface, which makes it possible to have a similar connection regardless of the type of cryogenic jacket.

The arrangement of the system is symmetrical on either side of the superconducting device 8 so as to allow the circulation of current and of voltage. In other words, a segment of the cable 1 and of its cryogenic jacket 2, as well as an electric-field-management component 6 and a terminal 3 are connected to each of the two ends of the superconducting device 8 and the system further comprises a cryogenic transfer return line 10 which connects the cooling unit 4 to a second terminal 3, that is to say the terminal 3 that is connected to the end of the superconducting device 8 that is opposite to the end of the superconducting device 8 that is connected to the first terminal 3.

The cryogenic transfer return line 10 allows the cryogenic fluid to circulate and it to be re-cooled.

Two configurations are possible for the cooling unit 4: either it may be a closed circuit, that is to say that the cryogenic fluid is cooled again in order to be reinjected, or it may be an open circuit, in which case the system further comprises a cold storage tank, for example a cryogenic fluid storage tank, which is regularly refilled.

The embodiment of FIG. 1 makes it possible to have a long superconducting cable 1 connecting two distant points while directly integrating a superconducting device 8 such as a fault current limiter.

If a transmission line of several kilometers length is provided, the portion of superconducting cable 1 in question may be divided into a plurality of segments that are linked to each other by intermediate junctions.

Nevertheless, by virtue of this embodiment, the two lengths of superconducting cable 1 that are connected to the superconducting device 8 may also be extremely short: in this case, the system may be regarded as a stand-alone superconducting device that is ready to be connected to an electrical grid or to any other power supply.

Figure 2:
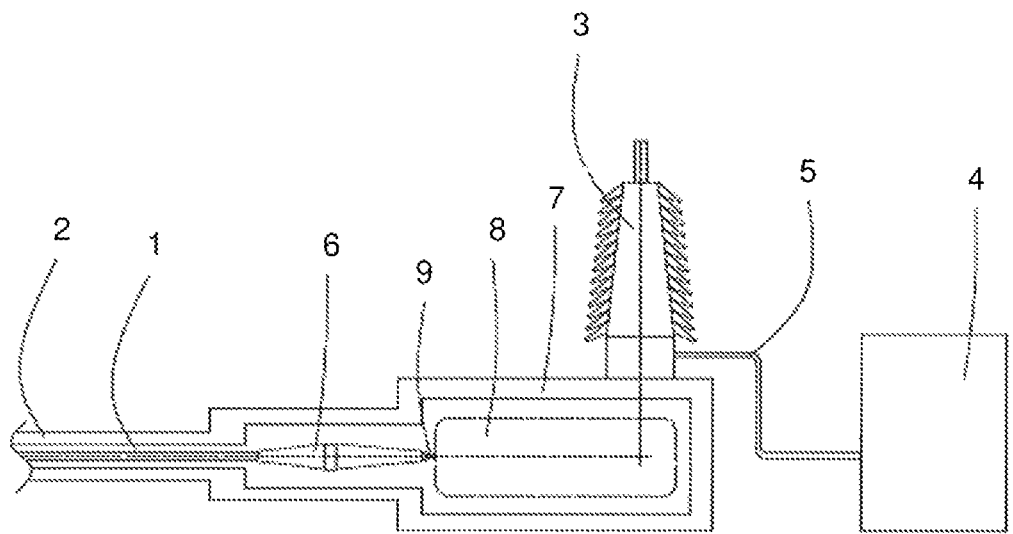
FIG. 2 is a schematic representation of a system in accordance with the present invention, in a second particular embodiment.

FIG. 2 shows another particular embodiment, in which the second cryogenic jacket 7 joins directly with the first terminal 3 and/or the second terminal 3. Thus, the terminal 3 is connected directly to the superconducting device 8.

The electrical connection between the superconducting device 8 and the terminal 3 and through the latter may be resistive or partially superconducting.

Figure 3:
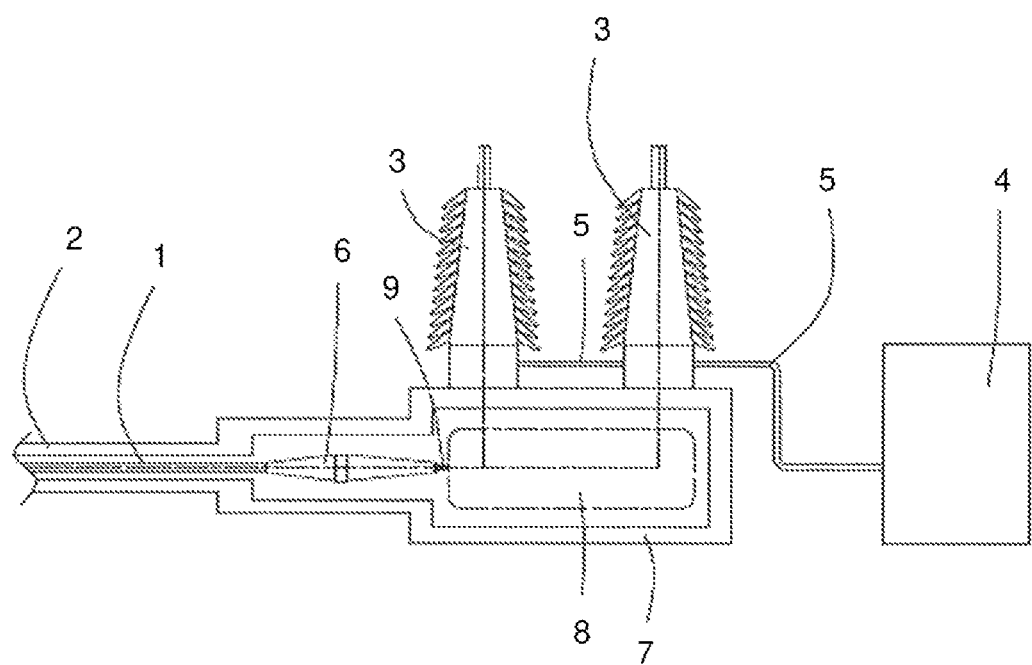
FIG. 3 is a schematic representation of a system in accordance with the present invention, in a third particular embodiment.

As shown in FIG. 3, if the current that is to be carried is very high, typically for a high-power transmission, a plurality of terminals 3 may be included in the second cryogenic jacket 7. By way of wholly non-limiting example, a 6 kA system may include two 3 kA terminals for injecting the current into the superconducting device 8.

Figure 4:
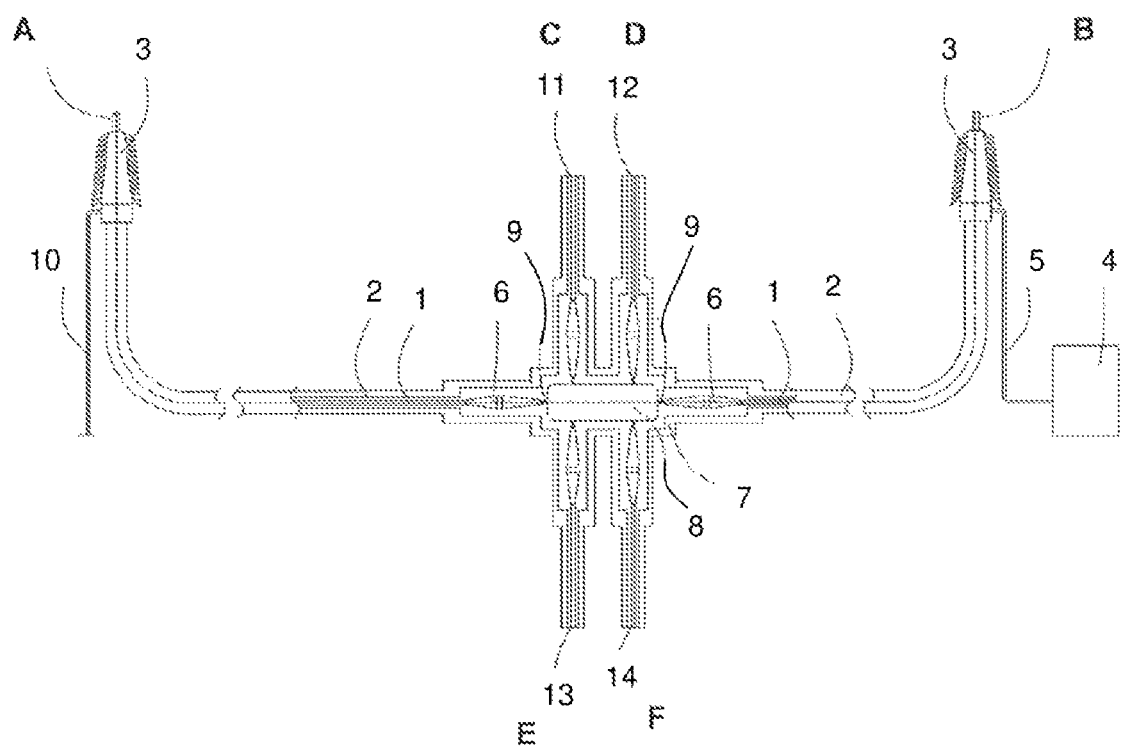
FIG. 4 is a schematic representation of a system in accordance with the present invention, in a fourth particular embodiment.

FIG. 4 shows yet another particular embodiment, in which the second cryogenic jacket 7 comprises a plurality of inlets, for example four inlets 11, 12, 13 and 14 in the embodiment illustrated.

A superconducting cable similar to the cable 1, equipped with an electric-field-management component similar to the component 6, may be connected to each of these inlets 11, 12, 13 and 14.

The superconducting device 8 may then act as a distribution box. By way of wholly non-limiting example, the superconducting device 8 may be a switching device which makes it possible to transmit energy solely from a point A to a point B, but while offering the possibility of partially or exclusively switching the energy toward a point C, D, E or F.

The number of inlets of the superconducting device 8 may be less than or greater than the number illustrated in FIG. 4 and described above.

The invention claimed is:

1. A superconducting cable system comprising:
   a superconducting cable;
   a first cryogenic jacket containing said cable;
   a superconducting device connected to said cable;
   a second cryogenic jacket containing said superconducting device;
   at least one first terminal connected to said superconducting device;
   a cooling unit connected to said at least one first terminal.

2. The system according to claim 1, wherein said system further comprises an electric-field-management component connected to a first end of said cable.

3. The system according to claim 2, wherein said electric-field-management component is contained in said second cryogenic jacket.

4. The system according to claim 2, wherein said electric-field-management component is a capacitor cone.

5. The system according to claim 1, wherein said system further comprises a cryogenic transfer line connecting said cooling unit to said at least one first terminal.

6. The system according to claim 1, wherein said first and second cryogenic jackets are mutually connected.

7. The system according to claim 1, wherein said superconducting device is connected to said cable by way of at least one dedicated electrical connection.

8. The system according to claim 7, wherein said at least one dedicated electrical connection can be plugged in.

9. The system according to claim 1, wherein said system further comprises:
  a second terminal;
  a cryogenic transfer return line connecting said cooling unit to said second terminal.

10. The system according to claim 1, wherein said cooling unit is a closed circuit.

11. The system according to claim 1, wherein said cooling unit is an open circuit and said system further comprises a cold storage tank linked to said cooling unit.

12. The system according to claim 1, wherein said at least one first terminal is connected directly to said superconducting device.

13. The system according to claim 1, wherein said at least one first terminal is connected to a second end of said cable and to said first jacket.

14. The system according to claim 1, wherein said second cryogenic jacket comprises a plurality of inlets that are designed to respectively connect a plurality of additional superconducting cables to said superconducting device, each of the superconducting cables of said plurality of superconducting cables being equipped with an additional electric-field-management component.

* * * * *